United States Patent [19]
Abend

[11] Patent Number: 5,633,341
[45] Date of Patent: May 27, 1997

[54] AT ROOM TEMPERATURE CROSSLINKABLE COMPOSITIONS, AND METHODS OF THEIR MANUFACTURE AND USE

[75] Inventor: Thomas P. Abend, St. Gallen, Switzerland

[73] Assignee: Ciba Geigy Corporation, Tarrytown, N.Y.

[21] Appl. No.: 211,297

[22] PCT Filed: Jul. 19, 1993

[86] PCT No.: PCT/CH93/00182

§ 371 Date: Mar. 30, 1994

§ 102(e) Date: Mar. 30, 1994

[87] PCT Pub. No.: WO94/04624

PCT Pub. Date: Mar. 3, 1994

[30] Foreign Application Priority Data

Aug. 17, 1992 [CH] Switzerland ............... 02553/92
Apr. 2, 1993 [CH] Switzerland ............... 01010/93

[51] Int. Cl.$^6$ .................................................. C08G 69/26
[52] U.S. Cl. ................... 528/335; 528/423; 528/503; 525/38; 525/36; 525/43; 525/44
[58] Field of Search .......................... 528/335, 423, 528/503, 507; 525/38, 36, 43, 44

[56] References Cited

U.S. PATENT DOCUMENTS

| 4,145,321 | 3/1979 | Lee ............................ 526/56 |
| 4,497,663 | 2/1985 | Fisher et al. ................. 134/4 |
| 5,071,937 | 12/1991 | Potter et al. ................ 528/45 |
| 5,244,946 | 9/1993 | Guest et al. ................. 524/86 |
| 5,376,710 | 12/1994 | Slongo et al. ............... 524/87 |

FOREIGN PATENT DOCUMENTS

| 0149354 | 7/1985 | European Pat. Off. . |
| 0359926 | 3/1990 | European Pat. Off. . |

OTHER PUBLICATIONS

Copy of the International Search Report.

*Primary Examiner*—James J. Seidleck
*Assistant Examiner*—Dvc Truong
*Attorney, Agent, or Firm*—David R. Crichton

[57] ABSTRACT

The invention concerns new, two component compositions, on the basis of liquid polymers containing acid anhydride groups and sterically hindered, aromatic di- or polyamines, said compositions being able to be crosslinked at room temperature. Characteristic of these compositions is their low toxicity and controllable crosslinking behaviour. The crosslinked products are characterized by high mechanical strength, thermal resistance and hydrolytic stability. The invention also concerns methods of manufacture of the said compositions and their use as coatings, potting compounds, sealants and adhesives.

21 Claims, No Drawings

AT ROOM TEMPERATURE CROSSLINKABLE COMPOSITIONS, AND METHODS OF THEIR MANUFACTURE AND USE

This application is a 371 of PCT/CH93/00182 filed Jul. 19, 1993.

SUBJECT OF THE INVENTION

The invention concerns crosslinkable, two component compositions and methods of their manufacture and use.

STATE OF THE ART

Liquid polymers or copolymers containing acid anhydride groups are valuable raw materials for the formulation of reactive adhesives, sealants, coatings and casting compounds. The acid anhydride groups can be distributed statistically or randomly in the molecule, or in the terminal position. The introduction of the acid anhydride groups can be achieved through copolymerization, through reaction with terminal reactive groups, through subsequent addition of unsaturated anhydrides onto individual or conjugated double bonds or by means of graft reactions.

In EP 048 128 and DE 3 830 895, the crosslinking of polymers containing acid anhydride groups with polyhydroxyl compounds has been suggested. The speed of crosslinking can be controlled through adding tertiary amines. The strength of the polymers containing anhydrides, crosslinked using polyhydroxyl compounds, and mainly the lower tear strength, restricts the area of application of the crosslinked compositions.

High strength of the crosslinked products is expected through reaction of polymers containing acid anhydride groups with polyamines. Di- or polyamines are recommended as a crosslinker in patent specifications EP 73 022 and EP 282 184, amongst others. Polymers react extremely rapidly with polymers containing acid anhydride groups, and large volumes are only able to be worked with difficulty in view of the very short work time. In addition, some aliphatic and aromatic amines are toxicologically suspect.

In order to cope with this difficulty, high molecular weight or polymeric polyamines are used. With the decrease in the concentration of the amino groups, the strength of the crosslinkage products will simultaneously decline.

In patent specifications DE 2 610 406, DE 853 477, EP 259 172 and EP 284 953, crosslinking of polymers containing acid anhydride groups with blocked polyamines has been suggested. Blocked polyamines containing ketimine, aldimine or oxalane groups require moisture or water in order to release the amines. By this reaction, aldehydes or ketones will be released, which must be diffused out of the crosslinked products. For this reason, these crosslinkers are in practice only suitable for thin layers.

In the patent specification DE 758 222, crosslinking of the liquid polymer containing anhydride with a complex of 4,4'-diaminodiphenylmethane and sodium chloride has been suggested. The disadvantage here is that higher temperatures must be used for crosslinking, and that the final product contains salt, for which reason application will be very restricted, mainly for reasons of corrosion protection.

There is a large demand, however, for shrink free elastic compositions which crosslink at room temperature, for casting, sealing, bonding and coating, and mainly for those with low toxicity.

The task which forms the basis of the invention is to make available new crosslinking agents, which react in ambient conditions with liquid polymers containing anhydride groups, the crosslinked products of which are distinguished by considerably higher mechanical strength, combined with initial tear strength and tear propogation resistance.

This purpose is fulfilled by the crosslinkable, two component composition according to claim 1 and the method of its manufacture according to claim 14. It is particularly solved by two component compositions of polymers containing acid anhydride groups and sterically hindered aromatic amines, diamines or polyamines as crosslinking agents. Steric hindrance means that the amino group is substituted in neighbouring or ortho positions.

The following are suitable as substituents: linear or branched alkyl groups with 1–4 C-atoms, such as methyl-, ethyl-, propyl-, isopropyl-, butyl-, sec.butyl- and tert.butyl groups.

The following are preferable:

1,3,5-Trimethyl-2,4-diaminobenzene,1-methyl-3,5-diethyl-2,4-diaminobenzene, 1-methyl-3,5-diethyl-2,6-diaminobenzene, 1,3,5-triethyl-2,4-diaminobenzene, 2,3,5,6-tetramethyl-1,4-diamino-benzene, 3,3',5,5'-tetramethyl-4,4'diaminodiphenylmethane, 3,3',5,5'tetraethyl-4,4'-diaminodiphenylmethane, 3,3',5,5'-tetraisopropyl-4,4'-diaminodiphenylmethane, 3,3'-dimenthyl-5,5'-diethyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, the product of the acid catalyzed reaction of aniline with formaldehyde which is alkyl substituted to the amine groups in both ortho positions, mixtures of the previously named amines or blends with an inferior quantity of monofunctional hindered aromatic amines, such as alkylated anilines, amounting to the preferred maximum of 49 equivalent percent. 2,6-diisopropyaniline should here be mentioned as a preferred example.

Further preferred are also reaction products of sterically hindered aromatic diamines with an inferior stochiometric quantity of di- or polyfunctional epoxydes, isocyanates, acrylic monomers, low molecular weight anhydrides, acid chlorides, aliphatic or aromatic acids, and acetoacetates.

The preferred amines are either liquid or solid at room temperature. Liquid amines are used as non-diluted liquids or are diluted with plasticizers, and the solids in the form of a solution in a solvent or plasticizer. Mixtures of a plurality of solid amines can form eutectic mixtures and thus exist in liquid form at room temperature. These amines are characterized in an advantageous way through lower vapour pressure, and toxilogically are not suspect for commercial use.

Their use as a crosslinking agent for the manufacture of crosslinkable, two component compositions on a basis of polymers containing anhydride groups fulfils the purpose of this invention in a particularly advantageous way.

Polymers which, as a binder, form the basis of these two component compositions, are polymers or copolymers, liquid at room temperature and containing acid anhydride groups, and with molecular weights up to 50,000 daltons. The acid anhydride groups can be statistically or randomly distributed in the molecule or in a terminal location. The introduction of the acid anhydride groups can ensue through copolymerization, through reaction with terminal reactive groups, through addition of unsaturated anhydrides on individual or conjugated double bonds, or through graft reactions.

Examples of such crosslinkable polymers are: Copolymers with olefinic unsaturated monomers, such as, for example, copolymers of maleic acid anhydride or itaconic acid anhydride with olefines, dienes, vinyl compounds, vinyl aromatic compounds, vinyl esters, vinyl ethers, acrylic and methacrylic compounds.

Addition products of unsaturated anhydrides on individual or conjugated double bonds are preferable, for example those on polymers of butadiene, isoprene, on copolymers of butadien or isoprene with cyclopentadiene, styrene, acrylonitrile, olefines with up to 12 C-atoms, on ester of unsaturated fatty acids, on terpenes or on liquid, unsaturated decomposition products of high molecular weight elastomers such as natural rubber, styrene butadiene rubber, SBS and SIS thermoplastic rubber. Particularly preferred are reaction products of maleic acid anhydride on polymers or copolymers of polybutadiene.

The addition of the unsaturated anhydride can also ensue on partially hydrogenated polymers, or the hydrogenation of excess double bonds can be undertaken catalytically after the anhydride addition.

Graft products which are obtained through the addition of olefinic unsaturated anhydrides on liquid polymers and copolymers, mostly under the action of radicals such as peroxydes and azo compounds. Particularly preferred is the addition of unsaturated anhdrides on EPDM, EVA, polyalphaolefines and acrylpolymers.

Preferred liquid polymers containing acid anhydride groups are also ester anhydrides, in particular polymeric esteranhydrides, thioesteranhydrides or amide anhydrides of polyhydroxyl compounds, polymercapto compounds, of polyamines with trimellitic anhydride, pyromellitic anhydride, benzene tetracarboxylic-dianhydride, benzophenon tetracarboxylic-anhydride.

The binders can, in an advantageous way, also be blends of the crosslinkable polymers. The preferred liquid polymers can, next to the anhydride groups, also contain other functional groups, for example alkoxysilyl groups or carboxyl groups.

The number average molecular weight of the liquid polymers containing the anhydride groups is within the range of 500 to 50,000 daltons. Preferred are liquid polymers with a number average molecular weight of 2000 to 30,000 daltons, which on average contain 1.5 to 10, preferably 1.8 to 8 anhydride groups per molecule. Expressed as an acid number, these polymers possess a value of 15 to 150 mg KOH/g, preferably 20 to 100 mg KOH/g (determined with water free, alcoholic potassium hydroxide solution, which gives a semi-ester).

It can be an advantage if the blend comprises polymeric anhydride with varying average molecular weight, if necessary with a varying number of anhydride groups per molecule. Alternatively, the blend can comprise polyfunctional polymers containing anhydride groups and monofunctional polymers with anhydride groups, especially such with low molecular weight. The mixture must, however, on average contain at least 1.5 anhydride groups per molecule.

The stochiometric ratio of the acid anhydride groups to the amino groups of the sterically hindered aromatic amine should be in the range of 3 to 0.6, preferable between 2 and 0.8.

By the reaction between the acid anhydride groups and the amino groups, an amide group and a carboxyl group will be formed, the latter forming a hydrogen bond with the amide group. These crosslinking bridges take effect in a reinforcing way with the aromatic nucleus of the amines, by which effect the systems according to the invention differ from state of the art compositions. At higher concentrations of the crosslinking amines, especially those comprising polycyclic or condensed aromates, there will, in an advantageous way, be a phase separation in a rigid phase of aromatic amides and in an elastic phase. By this means the tear strength and resistance to tear propagation will increase.

A particular advantage of the compositions according to the invention is their capability to form amide bridges, which are extremely thermally and hydrolytically stable. The substituents in their neighbouring location shield the amide groups from attack by hydroxyl ions or hydrogen ions.

Tertiary amines catalyze the addition of sterically hindered aromatic amino groups on acid anhydride groups to a very small extent. This permits the use of primary mono-, di- or polyfunctional hydroxyl compounds, together with the amines according to the invention for crosslinking of polymers containing acid anhydride groups, the reaction of the hydroxyl groups being catalyzed by means of tertiary amines. Hydroxyl compounds up to a maximum 49 equivalent percent, which are preferably mono-, di-, or polyfunctional, primary aliphatic alcohols with an equivalent weight between 30 and 3000, can replace the aromatic amines in the crosslinking components. Alcohols, di-, or polyoles are not only inexpensive, but also can serve to dissolve solid aromatic amines or lower the viscosity of the system.

Examples of alcohols and polyols are monofunctional primary alcohols with 2 to 30 C-atoms, ethylene glycol, diethylene glycol, low molecular weight polyethylene glycols, butandiol, blends of butandiol with pentandiol and hexandiol, polytatramethylene-etherglycol, 3-methylpentandiol, liquid bisphenol ethoxylate, neopentylglycol, cyclohexandimethanol, functional polybutadienes with hydroxyl groups, N,N-bis-hydroxyethyl anilines, glycerine, triethanolamine, N,N,N',N'-tetrahydroxyethylethylendiamine, N,N'-Bis-hydroxyethyl-piperazine.

Examples of catalytically effective, tertiary amines which are used in amounts of up to 2 parts per 100 parts binder/crosslinking agent mixtures are trialkylamine, preferably C12-C14-alkyldimethylamine, Di-C12-C14-alkylmethylamine, N-alkylimidazole, N,N,N'N'-tetramethylethlendiamine, diazabicyclo-octane (Dabco) and -undecene (DBU), also alkaline carbon acid salts are effective as catalysts.

The method of manufacture of the compositions according to the invention involves the intimate mixing of both components and subsequent curing through crosslinking. Mixing and crosslinking ensues preferably at temperatures between 0° C. and 15° C. Even at temperatures in the range of 0° C. to 15° C., the crosslinking reaction will take place with the amines according to the invention quantitively almost within the time span of a day.

Mixing can be carried out by hand, or with dynamic or static mixers. In particular with higher viscosity, higher molecular weight polybutadienes, working with static or dynamic mixers has shown itself to be advantageous, since, with that, no air is worked in.

The properties of the crosslinked compositions can be controlled by the expert in the art and depend, amongst other factors, on the polymer content, on the anhydride content of the polymer, on the degree of polymerization, on the proportion of comonomers, on the functionality, on the relationship of acid anhydride to amine, and on the kind of amine. Very soft to very hard compositions with varying tensile strength, tear resistance and permanent set, are the result.

Differing additives have a large influence on the various properties of the compositions in a liquid or crosslinked condition. For example: Inorganic or organic fillers, pigments, powdered metal, dyestuffs, carbon black, pyrogenic silica, short chopped fibres, powdered rubber, plasticizers, extender oils, bitumen, resins, non-reactive polymers, reactive modifying agents, tackifying resins, adhesive additives, organofunctional silanes, surfactants, silicon oils, flame retarding additives, antioxidants and light stabilizers, anti-corrosion agents, scents, fungistatic and bacteriostatic agents, thixotropic agents, blowing agents and foam stabilizers and solvents. The use and effect of these additives and their preferred concentrations are state of the art and known to the expert in the art.

The mixtures according to the invention are used for the manufacture of casting compounds, extrusion compounds, potting compounds, adhesives, coatings and sealants.

EXAMPLES

Definitions: % means percentage weight, T means proportions of mass.

Acid number: The acid number was determined with methanolic KOH. One acid group and one methylester will form per anhydride group.

Mechanical testing: Tear resistance was determined according to DIN 53 504, the tear propagation resistance according to DIN 53 507. Withdrawal speed 100 mm/min. The secant module was extrapolated at 50% elongation to 100% elongation. The indentation hardness was determined with the Shore A-test apparatus.

Materials used

Liquid, maleinized polybutadiene with 9.09% maleic anhydride, acid number 54 mg KOH/g, (Lithene LX16-10MA, Mn 8800; or N4-5000-10MA, Mn 5250; Revertex Ltd. Harlow UK)

Liquid, maleinized polybutadiene with 4.76% maleic anhydride, acid number 28 mg KOH/g, (Lithene LX16-5MA, Mn 8800; or Lithene N4-5000-5MA, Mn 5250; Revertex Ltd. Harlow UK)

Liquid EPDM, maleinated by graft reactions, Mn 2600, acid number 28 mg KOH/g (Lucant A 5560 / Mitsui Petrochemical Ltd Ind., Japan)

Plasticizer 2-ethylhexyl-benzyl-phthalate (Santicizer 261 / Monsanto Europe SA, Brussels-B)

Plasticizer Diisopropyl-diphenyl (Sure Sol 300 / Koch Chem. Co., Corpus Christi, Tex. USA)

Ethoxylated bisphenol A, OH-Number 272 mg KOH/g, (Dianol, AKZO Chem. Div. Amsterdam NL)

3,3',5,5'-tetraisopropyl-4,4'-diaminodiphenylmethane, amine number 306 mg KOH/g, (M-DIPA, Lonza AG, Basel CH)

C12-C14-Alkyldimethylamine (BASF AG, Ludwigshafen D)

Calcium carbonate, particle size 0–4 µm (Omya H95T, Plüss-Stauffer AG, Oftringem CH)

Calcium carbonate, particle size 0–25 µm (Omya BLR3, Plüss-Stauffer AG, Oftringen CH)

METHOD

Component A=Maleinized polymer with additives

Component B=Plasticizer, with dissolved crosslinking components, if necessary with the addition of catalyst.

The components A and B were homogenously mixed under ambient conditions and plates of 3 mm thickness were cast within 10 minutes. The mechanical properties were determined for the resulting crosslinked compositions after storage of 10 days under ambient conditions.

TABLE 1

Crosslinked compounds, using sterically hindered aromatic amines as crosslinking agents, according to the invention, as crosslinking agents (experiments 2–4, experiments 6 and 7), as compared to crosslinking agents according to the state of the art (experiments 1 and 5). Proportion: Anhydride groups to hydroxyl or amine groups=1. Mixing of components and crosslinking under ambient conditions.

TABLE 1

| Experiment No. | 1 | 2 | 3 | 4 | 5 | 6 | 7 |
|---|---|---|---|---|---|---|---|
| Component A | | | | | | | |
| 1) Lithene LX16-5MA | 500 | 500 | | | 500 | 500 | |
| 2) Lithene N4-5000-5MA | | | 1000 | | | | |
| 3) Lithene N4-5000-10MA | 500 | 500 | | | 500 | 500 | |
| 4) Lucant A 5560 | | | | 1000 | | | 1000 |
| 5) Sure Sol 300 | 375 | 353 | 375 | 375 | 344 | 353 | 375 |
| 6) Omya H95T | 666 | 666 | 666 | 666 | | | |
| 7) Omya BLR3 | 933 | 933 | 933 | 933 | | | |
| Component B | | | | | | | |
| 8) Santicizer 261 | 148 | 132 | 93 | 93 | 148 | 132 | 93 |
| 9) Ethoxylized bisphenol A | 148 | | | | 148 | | |
| 10) M-DIPA | | 132 | 93 | 93 | | 132 | 93 |
| 11) Alkyldimethylamine | 30 | | | | 30 | | |
| Total in proportions of mass | 3300 | 3216 | 3160 | 3160 | 1670 | 1617 | 1561 |
| Work life, minutes | 45 | 35 | 40 | 30 | 50 | 40 | 35 |
| Shore hardness A | 41 | 58 | 27 | 44 | 14 | 40 | 32 |
| Tesile strength N/mm2 | 0.75 | 1.75 | 0.80 | 0.90 | 0.22 | 0.68 | 0.55 |
| Module 50% | 0.60 | 1.30 | 0.23 | 0.70 | 0.20 | 0.50 | 0.50 |
| Elongation % | 64 | 102 | 285 | 89 | 75 | 77 | 65 |
| Tear strength N/mm | 0.52 | 1.96 | 0.83 | 0.56 | 0.19 | 1.62 | 0.36 |

Result of experiments: Crosslinked compositions with crosslinkers according to the invention on the basis of sterically hindered aromatic amines demonstrate considerably higher mechanical stability than compositions with crosslinkers according to the state of the art.

Inasmuch as the invention is subject to modifications and variations, the foregoing description should not be regarded as limiting the invention, which is defined by the following claims and various combinations thereof:

I claim:

1. Crosslinkable, two component composition based on liquid polymers as binders, said liquid polymers containing acid anhydride groups, characterized in that said composition contains as a crosslinker at least one sterically hindered aromatic amine.

2. Composition according to claim 1, characterized in that the sterically hindered aromatic amine is a di- or polyamine which, in the neighbouring or ortho-positions to the nitrogen, contains substituents to the nitrogen atoms, said substituents being selected from the groups of linear or branched C1- to C4- alkyl groups.

3. Composition according to claim 2, characterized in that the sterically hindered aromatic diamine or polyamine is a derivative of a polycyclic or condensed aromatic compound.

4. Composition according to claim 1, characterized in that the sterically hindered, aromatic amine is selected from the groups 1,3,5-trimethyl-2,4-diaminobenzene, 1-methyl-3,5-diethyl-2,4-diaminobenzene, 1-methyl-3,5-diethyl-2,6-diaminobenzene, 1,3,5-triethyl-2,4-diaminobenzene, 2,3,5, 6-tetramethyl-1,4-diaminobenzene, 3,3',5,5'-tetramethyl-4, 4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diethyl-4,4'-diaminodiphenylmethane, 3,3'-dimethyl-5,5'-diisopropyl-4, 4'-diaminodiphenylmethane, 3,3'-diethyl-5,5'-diisopropyl-4, 4'-diaminodiphenyl-methane, the product of the acid catalyzed reaction of aniline with formaldehyde, said product being alkyl substituted to the amine groups in both ortho positions, and their mixtures.

5. Compositions according to claim 1, characterized in that the aromatic amine also contains up to 49 equivalent percent of monofunctional, hindered aromatic amines.

6. Composition according to claim 1, characterized in that the stoichiometric ratio of acid anhydride groups of the binder to the amino groups of the crosslinker is in the range of 3 to 0.6.

7. Composition according to claim 1, characterized in that the binder is selected from the copolymers of maleic acid anhydride or itaconic acid anhydride groups with olefinic unsaturated monomers, addition products of unsaturated anhydrides on polymers with individual or conjugated double bonds, addition products of unsaturated anhydrides on unsaturated decomposition products of high molecular weight natural rubber, styrene butadiene rubber or thermoplastic styrene butadiene isoprene rubber, addition products which are obtained by radical graft reactions of olefinic unsaturated anhydrides on a liquid polymer, polymeric esteranhydride which is obtained by esterification of polyols with trimellitic anhydride, pyromellitic anhydride, benzene tetracarboxylic anhydride, benzene tetracarboxylic dianhydride, benzophenon tetracarboxylic dianhydride and blends of these binders.

8. Composition according to claim 7, characterized in that the binder is a reaction product of maleic acid anhydride on polymers or copolymers of polybutadiene.

9. Composition according to claim 7, characterized in that the binder possesses a number average molecular weight of 500 to 50,000 daltons.

10. Composition according to claim 7, characterized in that the binder is a blend of polyfunctional and monofunctional polymers containing anhydride groups with an average content of at least 1.5 anhydride groups per polymer molecule.

11. Composition according to claim 1, characterized in that the binder contains, in addition to anhydrides, other functional groups.

12. Composition according to claim 1, characterized in that a maximum of 49 equivalent percent of the sterically hindered aromatic amine is replaced by a mono-, di-, or polyfunctional, primary, aliphatic alcohol with an equivalent weight of 30 to 3000.

13. Composition according to claim 12, characterized in that the composition, in relation to 100 proportions of mass of binder and crosslinker, contains up to 2 proportions of mass of a tertiary amine as catalyst.

14. Composition according to claim 1, characterized in that it contains an additive selected from the group consisting of inorganic and organic fillers, pigments, powdered metal, dyestuffs, carbon black, pyrogenic silica, short chopped fibres, powdered rubber, plasticizers, extender oils, bitumen, resins, nonreactive polymers, reactive modifying agents, tackifying resins, adhesive additives, organofunctional silanes, surfactants, silicon oils, flame retarding additives, antioxidants and light stabilizers, anti-corrosion agents, scents, fungistatic and bacteriostatic agents, thixotropic agents, blowing agents, foam stabilizers and solvents.

15. Method of manufacture of compositions according to claim 1, characterized in that the components are homogeneously mixed and are allowed to cure at temperatures between 0° and 50° C.

16. The method of claim 15, wherein said temperatures are between 10° and 35° C.

17. Crosslinkable two component composition based on liquid polymers containing acid anhydride groups comprising sterically hindered aromatic amines as crosslinkers.

18. Compound for casting, potting or extruding comprising the composition of claim 1 or 17.

19. Compound for sealing or coating comprising the composition of claim 1 or 17.

20. Adhesive comprising the composition as claim 1 or 17.

21. The composition of claim 5, wherein the hindered aromatic amine is 2,6-di-isopropylaniline.

* * * * *